April 23, 1946.   R. K. SKINNER   2,399,069
BOLT ANCHOR
Filed April 20, 1945
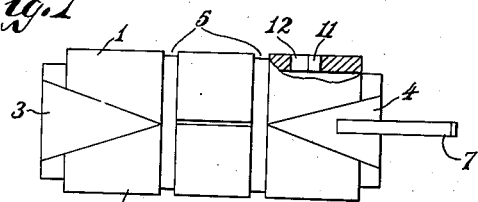
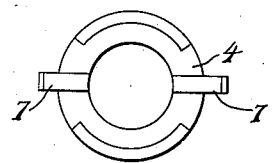
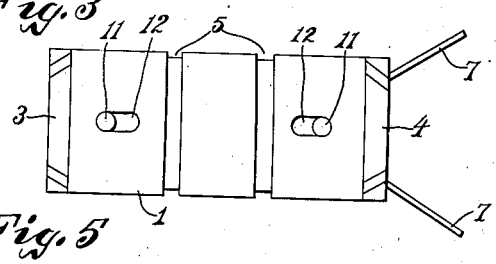
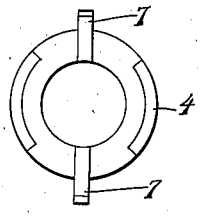
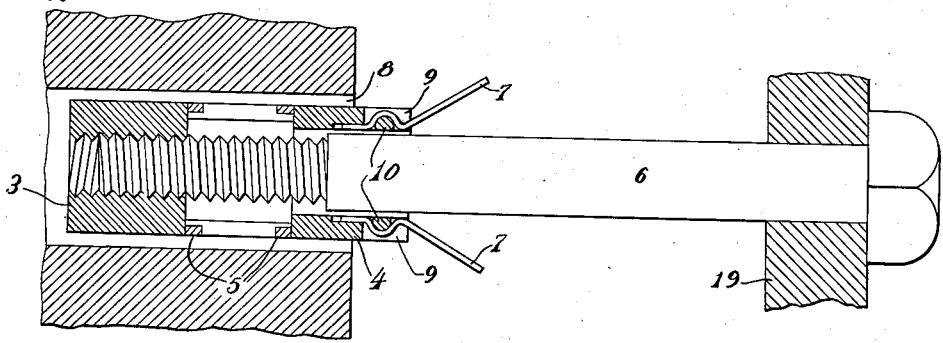
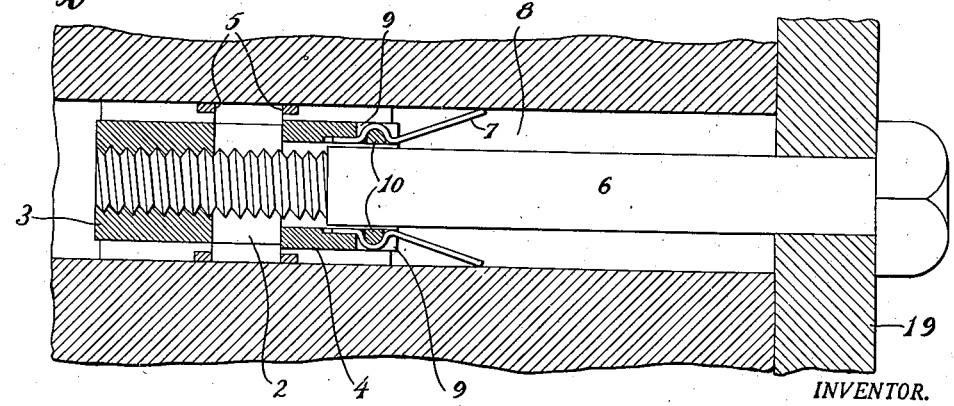
INVENTOR.
Roberts K. Skinner Patented Apr. 23, 1946

2,399,069

UNITED STATES PATENT OFFICE 2,399,069

BOLT ANCHOR

Roberts K. Skinner, West Hartford, Conn.

Application April 20, 1945, Serial No. 589,394

3 Claims. (Cl. 85—2.8)

This invention relates to anchors of the expansible nut type which are designed to be located in holes in objects such as walls, ceilings, or floors for receiving the threaded ends of bolts that are to secure in place other objects such as signs, conduits, machinery, etc.

Holes drilled in brittle materials, such as brick and concrete, to receive such anchors are unavoidably liable to be conical in shape near the mouth due to chipping. The most commonly used anchors are designed to grip the inner surface of the hole adjacent to its mouth where its conical shape provides an inefficient gripping surface.

With such prior constructions it frequently happens, especially if the anchor does not tightly fit the hole, that on rotating the bolt for expanding the anchor the anchor rotates with it and the shell sections are not caused to expand so as to grip the wall of the hole. Also rotation of the threaded bolt tends to draw forward the threaded wedge member, thus moving the anchor forward and away from its desired position until it reaches the mouth of the hole where it ceases rotation and is caused to expand due to pressure of the other wedge member against the object serving to cap the mouth of the hole.

The object of the present invention is to provide such anchors with simple, efficient and inexpensive means that are adapted to, by engagement with the walls of the holes or with the articles to be secured by the bolts, coincidently restrain the anchors from rotating and from being retracted toward the mouth of the holes when the bolts are screwed into the wedging members, and thus assure a firm hold of the anchors in the desired location in the holes.

In the accompanying drawing:

Figure 1 is a view looking at one side of a double wedge anchor that embodies the invention.

Figure 2 is a view looking at the end of Figure 1.

Figure 3 is a side view of the anchor shown in Fig. 1 rotated ninety degrees.

Figure 4 is a view looking at the end of Fig. 3.

Figure 5 is a longitudinal section showing the anchor being inserted into a hole with the means for preventing the rotation of the anchor expanded.

Figure 6 is a longitudinal section showing the means for holding the anchor in place and from rotating in a hole while a bolt is being turned to expand the anchor.

The anchor preferred illustrated is of a common type and comprises a shell formed of two longitudinally extending sections 1 and 2 that are capable of being wedged apart and diametrically expanded into gripping engagement with the wall of a hole by wedging member 3 in the inner end of the shell and a wedging member 4 in the outer end of the shell, which members are capable of longitudinal movement toward and from each other for causing the expansion of and allowing the contracting of the shell sections that are yieldingly held together over the wedging sections by encircling springs 5.

The bolt 6, which may serve to secure a sign or other article to a fixed support, passes freely through the wedge member 4 and is threaded into the wedge member 3. When the bolt is turned in one direction the inner threaded wedge member 3 is drawn forward toward the outer wedge member 4.

The wedge member 4 in the preferred form illustrated has a pair of stiff metallic spring fingers 7 that project obliquely outward from the wedging member 4 in such a manner that they will yield and allow the anchor to be easily inserted into a hole 8 and when the anchor is located in the desired place will engage the wall of the hole and acting as pawls restrain the member 4 from rotation and from being drawn toward the mouth of the hole. The inner ends of these fingers are shown as inserted into slots 9 in the member 4 and curved over bars 10 that extend across the slots so that the fingers cannot move forward or backward when the bolt 6 is threaded into the anchor, Fig. 6.

To retain the shell members 1 and 2 from longitudinal dislodgment from the wedge members 3 and 4 during handling, use and transportation without interfering with the expansion and contraction of the shell members the wedge members may be provided with lugs 11 that will extend loosely into slots 12 in the shell members, Figs. 1 and 2. The wedging member 4 is held from rotation by the tension of the spring fingers 7 against the wall of the hole. This member 4, by means of a pin and slot connection, prevents the rotation of the shell 1 which shell by a pin and slot connection holds the wedging member 3 from rotating. As a result of this construction there is co-action between all of the members, whereby when the bolt 6 is screwed into the member 4 that member will not be rotated by the friction of the threaded connection.

In the form illustrated a simple efficient and inexpensive attachment is shown coupled to a wedging member of the anchor and adapted to grip a surface of either of the two objects to be bolted together in such manner that the anchor will not rotate nor will its coupled wedging member be drawn outward when the bolt is screwed in.

The invention claimed is:

1. A bolt anchor having radially expansible members and axially movable wedging members engaged with said expansible members, and a bolt adapted to be threaded into a wedging member for changing the longitudinal relation of the wedging members to the expansible members and by such change alter the radial relation of the expansible members to the wedging members, and spring fingers projecting from one wedge member and adapted to be engaged with the wall of a hole in which the anchor is inserted for retaining the anchor from turning when the bolt is rotated.

2. A bolt anchor comprising radially expansible gripping means, wedging means adapted to be engaged by a bolt and moved longitudinally for expanding said gripping means, and resilient means connected to and extending obliquely outward from the forward end of the anchor with the ends thereof adapted to yield, as the anchor is entered into the hole it is to occupy but to engage the wall of said hole so as to prevent the anchor from being drawn forward and from being rotated when a bolt is turned in for causing the functioning of the wedging means.

3. A bolt anchor comprising radially expansible gripping means, wedging means adapted to be engaged by a bolt and moved longitudinally for expanding said gripping means, resilient means connected to and extending obliquely outward from the forward end of the anchor with the ends thereof adapted to yield as the anchor is entered into the hole it is to occupy but to engage the wall of said hole so as to prevent the anchor from being drawn forward and from being rotated when the bolt is turned in for causing the functioning of the wedging means, and slot and stud connections between said wedging means and gripping means which will allow longitudinal movement of the wedging means relatively to the gripping means but prevent independent rotary movement of any of the elements of the anchor.

ROBERTS K. SKINNER.